United States Patent
Bons et al.

(10) Patent No.: US 12,023,709 B2
(45) Date of Patent: Jul. 2, 2024

(54) METHOD OF APPLYING A SULPHUR-CONTAINING SEALING COMPOUND, APPARATUS THEREFOR, CORRESPONDINGLY TREATED AEROSPACE VEHICLE AND USE THEREOF

(71) Applicant: Chemetall GMBH, Frankfurt (DE)

(72) Inventors: Peter Bons, Reichelsheim (DE); Swetlana Reichert, Frankfurt am Main (DE); Bjoern Sievers, Frankfurt (DE); Miroslav Kralev, Hanau (DE)

(73) Assignee: CHEMETALL GMBH, Frankfurt (DE)

( * ) Notice: Subject to any disclaimer, the term of this patent is extended or adjusted under 35 U.S.C. 154(b) by 333 days.

(21) Appl. No.: 15/550,498

(22) PCT Filed: Feb. 12, 2016

(86) PCT No.: PCT/EP2016/053005
§ 371 (c)(1),
(2) Date: Aug. 11, 2017

(87) PCT Pub. No.: WO2016/128547
PCT Pub. Date: Aug. 18, 2016

(65) Prior Publication Data
US 2018/0029071 A1    Feb. 1, 2018

(30) Foreign Application Priority Data
Feb. 13, 2015    (DE) ................. 102015202619.1

(51) Int. Cl.
| | |
|---|---|
| *B05D 3/06* | (2006.01) |
| *B05D 5/00* | (2006.01) |
| *C08G 59/40* | (2006.01) |
| *C09K 3/10* | (2006.01) |
| *F16B 33/00* | (2006.01) |
| *F16B 37/14* | (2006.01) |

(52) U.S. Cl.
CPC ............. *B05D 3/065* (2013.01); *B05D 5/00* (2013.01); *C08G 59/4064* (2013.01); *C09K 3/1012* (2013.01); *F16B 33/004* (2013.01); *C09K 2003/1062* (2013.01); *F16B 37/14* (2013.01)

(58) Field of Classification Search
CPC ...... B05D 3/065; B05D 5/00; C08G 59/4064; C09K 3/1012; C09K 2003/1062; F16B 33/004; F16B 37/14
See application file for complete search history.

(56) References Cited

U.S. PATENT DOCUMENTS

| | | | |
|---|---|---|---|
| 3,645,816 A | 2/1972 | Billias et al. | |
| 3,661,744 A | 5/1972 | Kehr et al. | |
| 5,322,381 A * | 6/1994 | Argo, II ................. | B65D 47/06 222/566 |
| 6,001,181 A | 12/1999 | Bullen | |
| 6,435,427 B1 * | 8/2002 | Conroy ................ | B05B 1/1654 239/394 |
| 6,698,617 B1 * | 3/2004 | Szymanski ............ | B05B 15/65 137/15.01 |
| 7,438,974 B2 | 10/2008 | Obuhowich et al. | |
| 8,921,440 B2 * | 12/2014 | Weinmann ........... | C08K 5/0025 520/1 |
| 9,683,129 B2 * | 6/2017 | Cai ........................ | B32B 27/00 |

(Continued)

FOREIGN PATENT DOCUMENTS

| | | |
|---|---|---|
| CN | 202823767 U | 3/2013 |
| DE | 10020679 A1 | 11/2001 |

(Continued)

OTHER PUBLICATIONS

English translation of the abstract from JP-2000042467.*

(Continued)

*Primary Examiner* — Robert S Walters, Jr.
(74) *Attorney, Agent, or Firm* — Armstrong Teasdale LLP

(57) ABSTRACT

The invention relates to a method of sealing, coating or/and aerodynamic smoothing of at least one connecting element that protrudes from a surface or/and for sealing, coating or/and aerodynamic smoothing of a surface at a gap or at an uneven connection site with a sulfur-containing SCOD sealing compound at at least one application site, especially on an aerospace component, with at least one nozzle element and with at least one irradiation unit, which is characterized in that i) a nozzle element contains a mixed sealing compound and is guided or/and mounted over the connecting element protruding from a surface, over the gap or/and over the uneven connection site, ii) the connecting element protruding from the surface, the gap or the uneven connection site is covered fully with sealing compound, the sealing compound forming a sealing compound cover essentially in the form of a sealing compound cap, a coating or/and a mound-shaped or bead-shaped elevation, iii) the nozzle element or at least a portion is raised if required from the surface having the sealing compound cover, and iv) the curing of the sealing compound is initiated with the aid of at least one irradiation unit by energy input and by release of a latent catalyst or is brought about by direct activation of at least one reaction component, such that the mixed sealing compound subsequently cures or/and cures further. The invention also relates to a corresponding apparatus, to the aerospace vehicle treated in this way and to the use of the method and the apparatus.

25 Claims, No Drawings

(56) References Cited

U.S. PATENT DOCUMENTS

| | | |
|---|---|---|
| 2008/0134971 A1 | 6/2008 | Bradley |
| 2009/0217868 A1 | 9/2009 | Caseteuble |
| 2012/0244284 A1 | 9/2012 | Sanada et al. |
| 2013/0137817 A1 | 5/2013 | Laborbe et al. |
| 2014/0272287 A1 | 9/2014 | Cai et al. |
| 2015/0014933 A1* | 1/2015 | Pajel ............... F16J 15/02 277/312 |
| 2015/0044369 A1 | 2/2015 | Keener et al. |
| 2015/0065599 A1* | 3/2015 | Kralev ............... C08L 81/04 522/8 |

FOREIGN PATENT DOCUMENTS

| | | |
|---|---|---|
| DE | 10108136 A1 | 8/2002 |
| DE | 102012205951 A1 | 10/2013 |
| EP | 0182489 A1 | 5/1986 |
| EP | 1478703 B1 | 7/2006 |
| EP | 2347831 A1 | 7/2011 |
| EP | 2518374 B1 | 10/2012 |
| EP | 2586537 A1 | 5/2013 |
| EP | 2865509 A2 | 4/2015 |
| JP | S60251950 A | 12/1985 |
| JP | 2000042467 A * | 2/2000 |
| WO | 03070838 A1 | 8/2003 |
| WO | 2004069427 A1 | 8/2004 |
| WO | 2012021781 A1 | 2/2012 |
| WO | 2013090988 A1 | 6/2013 |
| WO | 2013153047 A1 | 10/2013 |
| WO | 2013154773 A1 | 10/2013 |
| WO | 2014066039 A1 | 5/2014 |
| WO | 2014184722 A1 | 11/2014 |
| WO | 2015/014876 A2 | 2/2015 |
| WO | 2015171312 A1 | 11/2015 |
| WO | 2016/128548 A1 | 8/2016 |

OTHER PUBLICATIONS

DIN EN ISO 868, Oct. 2003.
DIN 65262-1, Aug. 1996, par. 3.1.2.5.
DIN 65262-1, Aug. 1996, par. 3.1.2.3.
International Search Report and Written Opinion for International Application No. PCT/EP2016/053005, dated May 20, 2016, 9 pages.
"3M™ Adhesion Promoter AC-132", Aerospace Technical Data Sheet, 2013, 2 pages. URL—https://multimedia.3m.com/mws/media/958657O/3m-aerospace-sealant-ac-132.pdf.
Bons, et al., Unpublished DE Patent Application No. 102015202619.1, filed on Feb. 13, 2015, titled "Verfahren zum Auftragen einer Schwefel-haltigen Dichtmasse, Vorrichtung hierzu, entsprechend behandeltes Luft-oder Raumfahrzeug und seine Verwendung" (Method of applying a sulfur-containing sealing compound, apparatus therefor, correspondingly treated aerospace vehicle and use thereof), 54 pages.

* cited by examiner

METHOD OF APPLYING A SULPHUR-CONTAINING SEALING COMPOUND, APPARATUS THEREFOR, CORRESPONDINGLY TREATED AEROSPACE VEHICLE AND USE THEREOF

CROSS-REFERENCE TO RELATED APPLICATIONS

This application is the national stage entry of PCT/EP2016/053005 filed on Feb. 12, 2016 which claims priority to DE 102015202619.1 filed on Feb. 13, 2015, both of which are incorporated by reference in their entirety herein.

The present invention refers to a method for applying a sulfur-containing SCOD sealing compound by sealing, coating or/and aerodynamic smoothing of at least one connecting element that protrudes from a surface or/and by sealing, coating or/and aerodynamic smoothing of a surface at a gap or at an uneven connection site with a sulfur-containing SCOD sealing compound at at least one application site, especially on an aerospace component, a corresponding apparatus, a correspondingly treated aerospace vehicle and to the use of said method and apparatus.

Sealing compounds in the aerospace field are used to seal surfaces of components, in particular against air, water and/or fuel, in order to also provide a corrosion protection and to aerodynamically smooth external surfaces of components, in order to minimize air resistance, for example on airfoils and fuselage.

A surface to be sealed, in particular on an aerospace component has, during manufacturing of component, at least one connection element, which protrudes from the surface, such as for example essentially at least a respective bolt, rivet, screw, threaded pin, nut, rod or a similarly formed protruding connection element, at least one gap, such as essentially a leak, a hole, a seam, a groove or a contact site between a plurality of construction elements or/and at least one uneven connection site such as essentially a folded seam, an adhesion site, a welded site, a weld seam or/and a bump. The connection site is called, after the setting of the connection, the application site, since here a sealing is deposited (applied) with a sealing compound as a sealing compound coating.

The sealing compounds which are used in the aerospace field and corresponding application methods have the drawback of a particularly time-consuming processing method, in order, for example, to seal bolts, rivets, seams and welding seams with a well adhering fuel-resistant sealing compound, even after alternate stresses. If therefore components with 20, 200 or even several thousands of single application sites, at which for example a bolt or rivet has to be set and subsequently sealed such as a plane fuselage or an airfoil, have to be produced, then the steps which determine the speed of manufacturing are most importantly the steps of mechanical processes for precise localized drilling for connection sites, the connection of bolts or rivets, for example, the provision of seals at the application sites and corresponding standby times until the beginning of the subsequent process step. The following process step may be an access or movement of the component or further mechanical processing such as a further drilling on the component.

An essential speed defining step is the waiting period before a tack-free state of the sealing compound in at least one application site is achieved, since during this period, drilling chips and dirt may adhere to the adhesive sealing compound coating. This waiting period, before a tack-free state of sealing compound on at least one application site is achieved, frequently starts with the removal of at least one unit or/and one tool for setting or/and attaching at least one connection element during riveting or/and screwing or/and moving at least one nozzle element to the at least one application site to be subsequently treated. This waiting period until adhesion freedom of sealing compound on at least one application site comprises the application of a mixed or/and partially unsolidified sealing compound on at least one application site as well as the possible forming of at least one sealing compound coating essentially on at least one end form, which independently from each other preferably have approximately the shape of a coating, bell, cap or/and a mound-like or bead-like elevation on the surface, or/and the lifting or/and removal of at least one nozzle element or at least a portion of at least one nozzle element from the surface of at least one sealing compound coating. This waiting period until adhesion absence of sealing compound on at least one application site also comprises the initiation of curing of applied sealing compound (the sealing compound coating) by means of energy such as irradiation by UV light, such as the release of a latent catalyst and curing of the applied sealing compound, until a tack-free state is approximately achieved, wherein this last time is also known as "tack-free-time." This waiting period to tack-free state of sealing compound on at least one application site preferably ends at achieving a tack-free surface of the at least one sealing compound coating and is often a precondition for moving the component or/and other mechanical processing, cleaning of at least one unit or/and a tool, setting or/and attaching at least one connection element during riveting or/and screwing, for example.

Only a SCOD sealing compound (SCOD=Sealant Cure on Demand) allows a drastic acceleration of the curing of the sealing compound at the desired starting time and allows reaching a tack-free state or/and a Shore A hardness of 30, for example, in a shortest period of time.

In the sense of the present application, a one-component sealing compound is also considered "mixed," if—as usual—and because the contained components are uniformly distributed.

However, the drilling, connecting and sealing of, for example, 100 of such connection sites on an airfoil currently requires several hours, so that the construction of such air vehicles is negatively impacted, since a large airplane such as the Airbus A380 has a number of single connection sites in the order of 1,000,000. The number of individual connection sites for each surface of a component strongly depends on the kind of component. The object, however, is to reduce the cycle times in all areas and in particular said waiting time before the tack-free state of the sealing compound at at least one application site is reached.

An essential object in the manufacturing of aircraft vehicles is therefore to accelerate the manufacturing processes, without negatively impacting the construction requirements and a long-lasting quality of components.

Until now, a large number of connection sites of components in the aerospace field are still provided by hand, which is time consuming during manufacturing of an airplane, for example. In fact, huge numbers of precisely positioned holes are produced, then provided with bolts, screws or/and similar connection elements and finally sealed by means of sealing compound coatings, in order to provide a composite of different components, for example, a composite formed by a tank and the external surfaces of a wing. Similarly, for a flat sealing of adjacent elements or components, a sealing compound coating is used, which is usually and to a significant extent manually produced, and in which, at least a small external surface of the sealing compound is accessible from outside the component.

To this end, a cartridge is commonly used, which has two separate chambers, which are separately filled with the base mass and the curing agent. The cartridge content is then brought together and homogeneously mixed. This mass of mixed sealing compound is then used for manual application of sealing compound coatings, wherein application is usually point-like (over a bolt or screw, for example), linear (in the form of a sealing compound bead, for example) or two-dimensional (with an intermediate layer of sealing compound between two components, for example).

By applying a sealing compound on an application site, the usually handheld nozzle element has to be positioned in a possibly centered position over the connection element, which protrudes from a surface, and the required quantity of sealing compound has to be applied, without applying a too large or too small quantity of the same, without the coating of sealing compound over the connection element becoming too thin (a wall thickness smaller than 0.5 mm at at least one site on the coating over a protruding connection point, for example), whereby the sealing is insufficient, without the sealing compound coating being applied in a very eccentric position, and without the shape of the coating becoming very uneven. A drawback of manual application is also the low reproducibility of shape and dimension of the coating of sealing compound.

In an alternative production method, according to U.S. Pat. No. 7,438,974 B2, the coatings of sealing compound are partitioned, in particular preformed in the form of cones, which are filled with an uncured sealing compound and frozen. Prior to application, these preforms then reach room temperature. The method requires the displacement of any air from the cone during fitting of the connection element. This can be achieved only by squeezing any excess sealing compound and rotating the cone, wherein the excess of uncured sealing compound often forms an undesired and initially tacky bead of sealing compound on the base surface of the coating, such as on the cone base.

Also, this method is very time consuming and may be significantly improved by using a so-called SCOD sealing compound: to this end a modified method with respect to the invention with a modified apparatus could be used, in which at an application site at least one preformed cone of sealing compound, which is filled with an uncured SCOD sealing compound, is applied, for example with an application unit, with a handle or/and a holder, instead of a nozzle element, in which the preformed cone of sealing compound is optionally squeezed at the application site, wherein the uncured SCOD sealing compound or/and possibly the uncured SCOD sealing compound squeezed at the base of an applied preformed cone is irradiated by a radiation unit optionally carried by an application unit and is excited or/and led to an accelerated curing.

The applicant, which has an extensive experience in the aerospace sector, is not aware of any application, in the practice of airplane construction, of a sealing compound based on polythioether or/and polysulfide, in which a correspondingly suitable sealing compound is excited for curing by means of energy transmission through irradiation with UV light at wavelengths in the range of about 100 to 400 nm or by UV-VIS light at wavelengths in the range of about 300 to 600 nm.

It has been found that a considerable amount of time can be saved in the production of aerospace vehicles, for example, if, on one hand, an automatable application of a sealing compound or/and a partial or complete automation of the application of the sealing compound at the application site or/and the positioning of an irradiation unit for exciting the curing of an applied sealing compound coating is performed by command ("on demand") and if the applied sealing compound is selected to this end so that in a very short time a tack-free state or/and a Shore A hardness of 30, for example, is achieved, so that standby periods and also the entire production time are reduced by a larger factor with respect to a production of sealed connection sites, which are applied, to a great extent, by hand with a conventional and slow curing sealing compound.

It is presumed that the time savings obtainable with an inventive method and with at least one inventive apparatus with respect to current usual production times for the respective processing steps in a conventional production, which are performed, to a great extent, by hand with a conventional sealing compound, which is not excited to curing by energy transmission, lie between 10 and 50%, depending on the component, the requirements and the respective process conditions and their automation.

Only by combining an automatable or automatic application of a sealing compound as a coating and the selection of a sealing compound, which reaches, in a very short time, a tack-free state or/and a Shore A hardness of 30, for example, it is possible to achieve a drastic cost reduction in the production of components with a large number of application sites=connection sites. The SCOD principle (SCOD=Sealant Cure on Demand) allows a drastic acceleration of the curing of the sealing compound at the desired starting time and therefore allows the achievement of a tack-free state or/and a Shore A hardness of 30, for example, in a very short time, since all times related to curing are strongly correlated, as shown in table 2, so that the sealing compound usually only starts its curing on demand, and by energy transmission an initiation or activation of the chemical reaction is started. Only when a sealing compound is selected, which does not start its curing before the issuing of the command, or which, for example, does not substantially harden due to storage, preparation and environmental conditions, but only by few percentage points, a sealing compound may be used, which has a very short tack-free time, in spite of having a relatively long processing time.

Only by combining an automatable or automatic positioning and use of a nozzle element for automatic application of a sealing compound coating it is possible to achieve a considerably higher quality in terms of shape, dimensions, uniformity and reproducibility of sealing compound coatings as well as their centered positioning, which can never be achieved manually in case of a large number of application sites. In this way only air traps in and under the formed sealing compound coatings may be securely avoided. Air traps may lead to leaks or/and corrosion at the connection elements and are therefore very important for safety and have to be avoided in all conditions.

Various sealing compounds are known in the market of sealing compounds for aerospace application, which fulfill the very high requirements, for example, in terms of adhesion, long term load capacity, elasticity, oscillation resistance, flexibility at low temperatures, fuel resistance and resistance to meteorological agents over a wide temperature range.

So-called base masses with the addition of a curing agent are defined as sealing compounds or mixed, uncured or at least partially uncured sealing compounds. Sealing compounds are preferably formed by homogeneous mixing of one or more base masses with at least one curing agent, which occur in an admixed, uncured or partially uncured state in their components totally or partially in a mixture, which, however, during curing, react and form an essentially homogeneous polymeric network. The weight proportions of sealing compound and curing agent are in a plurality of admixed sealing compounds in the range between 1:1 and 10:1, 2:1 and 8:1 or between 3:1 and 6:1.

Freshly admixed sealing compounds, which could not significantly harden yet, usually have a viscosity in the range from 50 to 2000 Pa*s, measured at room temperature with a rotational viscometer. Their viscosity on horizontal surfaces like airfoils often lies between 100 and 200 Pa*s, whereas in the case of vertical surfaces, on which the sealing compound has to be applied, their viscosity often lies between 1500 and 2000 Pa*s.

Sealing compounds are also used for coating of substrate surfaces, for connecting or/and gluing of elements as well as for sealing or/and filling of cavities or/and interspaces of components at application sites. Currently, the fuel resistant sealing compounds in use are sulfur containing polymers, which reticulate when cured. Usually the curing starts in all practical sealing compounds with the addition of the curing agent to the base mass and corresponding mixing.

The drawback of these known sealing compounds and methods for their processing and curing is that for a given required processing time, only a small quantity of catalyst can be introduced in the sealing compound, in order to get the desired acceleration of curing. This, in particular, in case of long processing times, causes the sealing compounds to considerably slow down the processes due to their long curing times. However, a rapid and thorough curing is required also for sealing compounds with long processing times.

The fastest curing sealing compounds used nowadays, which contain mercapto-terminated base polymers, allow a processing time of only about 10 or 15 minutes, if they have to reach, during curing, within 60 minutes, a Shore A hardness of 30—tables 1 and 2. This requirement is achieved only with difficulty and only with particular compositions of sealing compound.

There is also the problem that in case of two-component and preferably room temperature curing sealing compounds, the time to reach the tack-free state and the through-curing is considerably longer than the processing time.

Therefore, conventional coating processes often require long cycle times for manufacturing components—see table 2.

The criteria used for achieving a certain degree of curing may comprise the time to reach a Shore A hardness of 30, as measured according to DIN EN ISO 868, October 2003, with a Type A Shore durometer. The tack-free time, measured according to DIN 65262-1, August 1996, par. 3.1.2.5 is also very important for measuring the curing of the sealing compound, which starts at the surface of the sealing compound. In fact, the tack-free time determines the cycle times during manufacturing of components, since for the various operations on the components, the time in which an applied sealing compound is still tacky, causes a stop of the mechanical processing nearby, so that waste, abraded material, chips, dirt or/like dust, for example, get on the still fresh surface of the sealing compound coating and bond. Such defects have to be avoided, since they may deteriorate the functionality, the sealing and the corrosion protection of the sealing compound. A smooth and defect-free surface is also very important for a subsequent cleaning or/and painting of the component as well as for the aerodynamics at the application sites in the outer area. Therefore, the through-curing time has to be as short as possible. Observing these parameters in general the processing time is usually the starting point, whereas the tack-free time and the through-curing time are essentially defined by the sealing compound class. After the tack-free time, the so-called tack-free time TFT, the sealing compound no longer adheres to the surface of a sealing compound coating, and a polyethylene film may be removed, without residues, from the sealing compound surface, pursuant to DIN 65262-1, August 1996, par. 3.1.2.5. Table 1 defines the important time parameters for curing of sealing compounds. Table 2 provides an overview of typical times for curing of sealing compounds with mercapto-terminated base polymers, according to the state of the art and with respect to applicable sealing compounds with a short tack-free time according to the invention.

TABLE 1

Explanation of terms of processing properties related to sealing compounds

| Term | Definition |
|---|---|
| Processing time | Time period from admixing of base mass and curing agent or from start of curing until the sealing compound is no longer applicable due to increase in viscosity. It is verified pursuant to DIN 65262-1, August 1996, par. 3.1.2.3. |
| Tack-free time | Time period from admixing of base mass and curing agent or from start of curing until reaching a tack-free surface of a sealing compound coating. It is verified pursuant to DIN 65262-1, August 1996, par. 3.1.2.5. |
| Through-curing time | Time period from admixing of base mass and curing agent or from start of curing until reaching an initial hardness of Shore A 30. It is verified pursuant to DIN EN ISO 868, October 2003, with a type A Shore durometer. The value of the Shore A hardness is read within a second. |

TABLE 2

Overview of trends and selected typical times for curing of sealing compounds of the state of the art and according to the invention, for mercapto-terminated base polymers.

| Term (time in minutes) | Conventional sealing compounds | | | SCOD sealing compounds according to the invention | | |
|---|---|---|---|---|---|---|
| Processing time | 10-15 | About 25-35 | About 120 | 10-15 | About 25-35 | About 120 |
| Tack-free time | 30-120 | 120-600 | 480-840 | 0.01-5 | 0.01-5 | 0.01-5 |
| Through-curing time | 60-240 | 180-1800 | 540-2880 | 10-60 | 20-120 | 30-240 |

These data refer, also in the case of conventional sealing compounds, only to sealing compound systems, which are tuned to the requirements of an automatable application and which may be usually irradiated, in use, on surfaces of sealing compound coatings, which can be irradiated. In fact, the transmission of energy for the inventive sealing compounds presupposes that the sealing compound coating, in use, has at least a small surface, which may be freely irradiated, and is not substantially or completely covered by contact surfaces. Therefore, data in table 2 do not consider classes of sealing compounds, which are normally used only covered on entire side surfaces between components. No sealing compound coating is therefore considered, such as in particular intermediate layer sealing compounds of class C.

The use of sealing compounds for manufacturing or maintenance of aerospace vehicles has been a very complex process, up to now. The reason are the various connection sites with sealing compounds, in which the sealing compounds have to be used with frequent longer processing times, which however currently require a very long time for complete curing, proportional to the processing time, and a very long tack-free time—table 2.

A conventional sealing compound in class A-2 or B-2 requires for example, for the aerospace sector, as in table 2, with a processing time of 120 minutes, a through-curing time of about 9 to 48 hours and typically of 14 hours until Shore A hardness 30 is reached. These are more conventional bead-sealing compounds=compounds of class B and conventional paintable overcoat-sealing compounds=sealing compounds of class A. Sealing compound coatings made of compounds of class A and B may usually be irradiated, since the sealing compound coatings have larger freely accessible surfaces, which are not inserted between two essentially parallel components like the interlayer-sealing compounds of class C. Moreover, conventional sealing compounds of classes A and B, which usually are essentially shaped like so-called beads or are essentially flat, cap-shaped or bell-shaped, for coating of bolts, rivets or other construction elements, with a processing time of 30 minutes, usually require 2 to 10 hours, in order to become tack-free, and usually 3 to 30 hours for reaching Shore A hardness 30.

A sealing compound on flying vehicles in particular have the task to seal sections on surfaces. Many sealing compounds have a higher or high fuel resistance and a good adhesion. Many sealing compounds also allow, due to their good sealing and adhesion, a high corrosion resistance against metallic materials, in that, they also hinder the penetration of water and salt. When the sealing compound coatings on outer surfaces of components have adequate forms and essentially smoothed out surfaces of sealing compound coatings, the aerodynamic requirements are fulfilled.

A sealing compound often connects different construction elements, wherein the sealing has to be ensured also during and after oscillations during use. In the case of flying vehicles, it is important that construction elements in the area of the fuel tanks and fuel connection elements are securely and durably sealed. The secure and durable sealing of construction elements is very important in particular in the area of the airfoils, since the inner spaces of airfoils are often used as fuel tanks.

Only few sealing compound types remain sufficiently adhering in the long run and are at the same time flexible at low temperatures, fuel resistant and temperature changes resistant. To this end sulfur containing polysulfide and polythioether-polymers have shown to be effective.

In the manufacturing of elements for airborne vehicles usually hundreds or thousands of connection elements such as rivets or/and screwed connections are used, which have to be securely and permanently sealed inside or/and outside on the respective surface, such as an airfoil. The mechanical processing of construction elements at precisely determined and localized application sites such as an airfoil, by drilling, for example, the setting of the connection elements and the accurate execution of the sealing at each application site require a considerable effort in processing and time, which today is essentially manually performed by qualified operators.

WO 2013/154773 A1 describes, among other things, caps for sealing of mechanical fixing elements, which have a casing with an outer surface and an inner surface and which define a cavity, which has an opening, going through the casing between the outer and the inner surface, and whose cavity is at least partially filled by the sealing compound.

EP 2 586 537 A1 discloses nozzles for application of sealing compounds, which have a bell-shaped or dome-shaped nozzle tip and a gripping ring on the injection side of an oblong nozzle element. The injection may be manually performed or by using automated sealing compound-injection machines.

EP 2 518 374 B1 protects apparatuses for sealing a gap between a pair of surfaces, wherein the apparatus includes a nozzle for injecting sealing compound into the gap, and an endless belt driven by rollers is used to move the injector and irradiation unit.

The object is therefore to provide a method and apparatuses, with which the time and optionally the processing effort for sealing, coating or/and aerodynamic smoothing of application sites with a connection element protruding from the surface, with a gap or with an uneven connection site may be considerably reduced. In this case, it would be advantageous if the quality of application sites sealed by a cured sealing compound could be further improved, without wasting time. Moreover, a simplified and rapid manufacturing of aerospace components would be advantageous.

This object is achieved by a method of sealing, coating or/and aerodynamic smoothing of at least one connecting element protruding from a surface or/and of sealing, coating or/and aerodynamic smoothing of a surface at a gap or at an uneven connection site with a sulfur-containing SCOD sealing compound at at least one application site, in particular on an aerospace component with at least one nozzle element and with at least one irradiation unit, which is characterized in that i) The at least one nozzle element, whose inner space is indirectly or directly connected to a sealing compound reservoir, i.e.: to at least one mixing apparatus, to at least one sealing compound tank, to at least one cartridge or/and to at least one cartridge magazine, contains a mixed, uncured or at least partially uncured SCOD sealing compound, which is guided or/and slipped over the connection element protruding from a surface, over the gap or/and over the uneven connection site, and is therefore brought into contact with the surface or near the surface, ii) The inner space of at least one nozzle element is filled with the SCOD sealing compound from a sealing compound reservoir, such as a tank, and is brought at least approximately in contact with the surface to an extent, that the connection element protruding from the surface, the gap or the uneven connection site—that are all indicated as "application site"—is completely covered by the SCOD sealing compound, wherein the SCOD sealing compound forms an sealing compound coating, which essentially has the shape of a sealing compound cap, of a coating or/and of a mound-shaped or bead-shaped elevation, iii) At least one nozzle element or at least a part of at least one nozzle element, if necessary, is raised or/and moved from the surface with the sealing compound coating, so that damages to the sealing compound coating may be avoided, and iv) The curing of the SCOD sealing compound 1) is initiated by at least one irradiation unit through energy transmission into a sealing compound coating, such as by irradiating with high energy radiation and 2a) wherein or/and whereby it is initiated by release of a latent catalyst or 2b) wherein or/and whereby it is obtained by direct activation of at least one reaction component, so that the mixed SCOD sealing compound subsequently cures or/and cures further.

The apparatus associated with the inventive method, in a particularly preferred embodiment may a) comprise at least one container with at least one sealing compound reservoir such as at least one sealing compound tank, b) comprise at least one nozzle element or/and c) at least one irradiation unit. A mixing apparatus with a sealing compound tank is specifically required when no already admixed sealing compounds are used. In case of smaller quantities of sealing compound, a one-component sealing compound or an admixed multicomponent sealing compound may also be provided in cartridges or larger containers, so that, possibly, a larger sealing compound tank may be omitted. The cartridges may be stored, if required, in a cartridge storage.

A method is particularly preferred, in which an optionally continuous application of sealing compound on the application site and subsequently the direct initiation or activation of the chemical reaction are performed by at least one irradiation unit for accelerating curing in particular on the surface of the sealing compound coatings.

At method step iii), in particular, the nozzle element or at least one portion of the nozzle element is raised or/and moved from the surface with the sealing compound coating, in particular when the nozzle or cap otherwise would hit the sealing compound coating or/and if at least one part of the nozzle element may not be moved in parallel to the surface over the sealing compound coating, in order to avoid damages to the sealing compound coating.

The term "application site" according to the application comprises both the three types of connection element protruding from a surface, the gap and the uneven connection site, which have to be provided with a sealing compound coating, and, optionally, the position on the surface, which has to be treated.

The term "near the surface" according to the application means that the most advanced point, line or surface of the nozzle element, which is moved closer to the surface in step i), is brought to a distance in the range between 0.01 and 20 mm, 1 and 12 mm, 2 and 8 mm or 3 and 5 mm from the surface. This distance also comprises a space for removing, if necessary, excess sealing compound and wherein the sealing compound coating at the application site, in particular in case of an essentially linear and surface parallel application, such as for forming beads, or in particular with an essentially rotating and surface parallel application, such as for providing cone-shaped forms, may be applied in the most suitable way, possibly also in a uniform way or/and with a smoothed uniform surface of the sealing compound coating.

Additionally, at step (v) the entire nozzle element or parts thereof such as the connection element or/and the nozzle extension, the nozzle or cap are cleaned, removing residues of sealing compound. It may be advantageous if the nozzle element or parts thereof after a certain number of sealing compound coatings, or before or after a nozzle element replacement, or of parts thereof, are cleaned removing sealing compound. Alternatively, a soiled nozzle element or one of its parts may also be discarded and replaced by a new nozzle element or one of its parts, if required. Due to the replacement of a nozzle element, due to the type of application with a certain nozzle element or/and due to the selected sealing compound volume, the shape and dimensions of a sealing compound coating may be changed with much more flexibility and rapidity than with previous frozen preforms, which have to be prepared with the same geometry, dimensions and shape in huge numbers on a support for application. The provision of multiple injection molds for preforms with different geometries, dimensions and/or shapes is also very onerous and limits the application's flexibility.

In the inventive method, it is preferred that the SCOD sealing compound at step ii) is led or/and ejected from a sealing compound reservoir such as a tank preferably under pressure on the connection element in a continuous line or in portions of a line.

In the inventive method, it is preferred that the still uncured sealing compound coating, before step iv) is formed or/and its surface is smoothed with a tool or/and at step ii) or/and iii) it is formed or/and superficially smoothed by spatial and in particular linear or/and rotating movement of the nozzle element by ripping the sealing compound line or/and by moving a tool, in order to be applied on the final form.

The shape of the sealing compound coating is preferably evened out or/and symmetrically formed or/and the surface of the sealing compound coating is as smooth as possible.

The tool may essentially be a rod, spatula, blade, bar, knife or protrusion on a holder, with which the sealing compound coating is formed or/and superficially smoothed, in particular by moving the tool. Such a process is particularly advantageous in the case of bead-shaped sealing compound coatings. In particular in the case of forming such a bead, possibly by using a so-called bead sealing compound, the forming of the sealing compound coating may be provided over the geometry of the nozzle or of the nozzle extension with at least one nose, edge or/and blade and possibly by moving the nozzle or the nozzle extension.

In the inventive method, it is preferred that the sealing compound coating is essentially brought into a final form, which approximates the shape of a coating, bell, cap or/and a mound-shaped or bead-shaped elevation on the surface.

In the inventive method, it is preferred that the sealing compound coating is applied on a cleaned surface, which has an adhesion agent in the area of the contact surface of the sealing compound coating. Any adhesion agent may be essentially used, which allows an adequate adhesion on the base. Adhesion agent's compositions may be used, which have a content of water or/and organic solvent, such as those based on silane, silanol, siloxane, or/and polysiloxane or/and titanate or/and zirconate. The adhesion agent or the adhesion agent layer is in particular used for improving adhesion to the surface. In case of metallic surfaces, the use of an adhesion agent based on silane, siloxane, or/and polysiloxane has proved particularly effective and in case of surfaces made of a composite material, an adhesion agent based on titanate or/and zirconate has proved particularly effective. The adhesion agent may essentially be applied in any suitable way, such as painting, spraying, submerging, or/and manual or automatic application with an application unit similar to a felt-tip pen or cloth imbued with the adhesion agent.

This surface may in particular be made of a metallic material such as an alloy of aluminum, steel or zinc, a composite material such as carbon fiber reinforced carbon CFC or carbon fiber reinforced plastic CFRP or/and an organic material or/and plastic such as a plastic material based on polyetherimide PEI, polycarbonate PC or polymethylmethacrylate PMMA or a glue or/and paint such as paint based on epoxy-, polyurethane- or/and (meth)acrylate.

A latent catalyst according to the present invention is a catalyst, which is suitable for promote the reaction between the reactants, and which is temporarily deactivated by a blocking protection group or an envelope made of an encapsulating material, wherein the block or deactivation is removed by energy transmission such as high energy radiation. In latent catalysts with blocking protection groups, an amino-group may be blocked by a salt, for example. In latent catalysts with encapsulation, the encapsulation made of polymer or/and wax, may be burst, melted or/and opened by energy application, such as high energy radiation. In latent catalysts, which initially have the form of base components or/and complementary components, the active catalyst is formed only at a later time by external energy application. The energy application causes in this case the release of a latent catalyst or/and the direct activation of a reaction component.

In the inventive method, it is preferred that the admixed, the uncured or the at least partially uncured sealing compound is such that the curing is obtained by energy input or/and direct activation of at least one reaction component and then cures or/and in which the curing is initiated by energy input and release of a latent catalyst with subsequent curing.

The Following Publications Disclose SCOD Sealing Compound Systems:

So-called SCOD sealing compounds (="Sealant Cure on Demand") are sealing compounds, in which the curing is activated "on demand" by energy input.

1) EP 1 478 703 B1 discloses one and two-component sealing compounds, which, among others, contain mercapto-terminated sulfur containing polymers based on polysulfide, polyether or/and polythioether and a latent catalyst. The latent catalyst may be released or/and formed in active form by external energy input, whereby the reaction between sulfur-containing base polymer and curing agent is activated or/and accelerated for curing. The sealing compound may contain an encapsulated latent catalyst in the active form; its encapsulation may be molten, burst or/and opened or released by chemical reaction through energy input. The latent catalyst may also be present as initial and/or complementary partial components, which react with each other only by external energy input whereby the active catalyst is formed. The activation may take place through thermal radiation, inductive heating, high frequency excitation and resistor heating. The activation by means of UV light is not explicitly mentioned.

2) US 2013/0137817 A1 discloses sealing compounds, which contain liquid sulfur-containing polymers and as a reaction partner (curing agent) at least one blocked bismaleimide-based compound, wherein the curing agent is released at temperatures in the range of 60 to 120° C. thereby starting the reaction. The disadvantage in this case is that the mentioned high temperature must be held for over 15 min to 2 hours to achieve curing. But an increase in temperature in the aircraft industry is always disadvantageous, since aluminum materials have high coefficients of thermal expansion. Neither the activation by UV light nor a latent catalyst are explicitly mentioned.

3) WO 2012/021781 A1 and WO 2014/066039 A1 disclose radically curing sealing compounds based on thiol-terminated polythioether with a polyene with a polyvinylether and/or polyallyl-compound or with an alkenyl-terminated compound, which can be cross-linked by actinic radiation. In this case, a photoinitiator is to absorb UV radiation and convert it into a radical which initiates polymerization. These publications disclose to this end acetophenones, α-aminoalkylphenones, benzoinether, benzoyloxime, acylphosphine-oxides, bisacylphosphine-oxides, benzophenones, Michler's ketone, thioxanthones, anthraquinones, camphorchinone, fluorones and ketocoumarin. In this case, the radical which is split from the photoinitiator initiates the reaction, i.e. the radical polymerization. However, these compounds have the disadvantage that they don't undergo curing as one-component sealing compounds in the areas, which are not reached by the UV radiation, so-called shade areas, and that they don't show further curing after the end of irradiation.

4) Moreover, WO 2013/153047 A1 discloses a two-component sealing compound, which contains mercapto-terminated base polymers based on polythioethers, polysulfide, respective copolymers or/and mixtures thereof which can be cured with isocyanate compounds. In this system, a photoinitiator or a photolatent base on the basis of α-aminoketone initiates curing, whereby very short tack-free times are achieved. These compositions have the advantage that they facilitate, due to the presence of a tertiary amine, a post-curing after the end of irradiation and that they cure also in areas which are not reached by UV radiation, so-called shade areas.

Now, a new, preferably two-component sealing compound-system has been found, in which the polythioether based compounds with an epoxy-based curing agent and with a photolatent base initiate curing by energy input through high energy radiation, and in which very short tack-free times are achieved. The base mass is essentially based on at least one composition of liquid polythioethers, which carry a respective mercapto group at the molecule's ends. The polyethers may possibly contain up to about 50 mol % of disulfide groups within the molecule. The base mass may also additionally contain at least one disulfide containing compound, such as at least one polysulfide in a proportion to the base mass of up to 80% weight. The sulfur containing polythioether base polymers preferably have a mercaptan content relative to the reactive SH-groups with respect to the entire base polymer in the range from 0.5 to 10 or from 1.5 to 7% weight or/and a total content of sulfur in the range from 5 to 45 or from 12 to 36% weight. If necessary, long chain polythioethers with a molecular weight between 2500 and 6000 g/mol and short chain polythioethers, in particular with a molecular weight of about 500 to 2500 g/mol may be mixed together. The proportion of long chain to short chain polythioethers is preferably in the range from 25:1 to 0.5:1 and in particular between 20:1 and 2:1 or 14:1 and 8:1.

The curing agent in this new sealing compound-system is epoxy based and is usually free of manganese oxide, inorganic and organic peroxide, vinyl compounds and isocyanates, if no co-curing is desired. This is especially true, when only the at least one epoxy compound is used as a curing reagent. In case of a co-curing, it may still make sense if the same at least one other of these curing reagents selected from manganese oxide, inorganic and organic peroxide, vinyl compound and isocyanate is used in addition to the epoxy compound, especially with the simultaneous use of epoxy with isocyanate or epoxy with manganese oxide. The epoxy compounds are preferably only added to the curing agent. Therefore, the curing of the sealing compound is carried out with at least one epoxy-based compound. In particular, exclusively di-functional or multifunctional epoxy resins are used, having functionalities of F=2 to F=5 The functionality of the mixture used is preferably F=2.0 to 3.0 or 2.2 to 2.8. As the epoxy compound, diglycidyl ether of bisphenol A, diglycidyl ether of bisphenol F, aliphatic polyglycol diglycidyl ether, hydantoin-epoxy derivatives, epoxidized unsaturated and/or phenolic resins, epoxy novolac resin, more preferably cross-linked epoxy novolac resin and/or an epoxy resin are preferably used, which is based on several of the above classes, for example, a bisphenol F novolac resin. To the curing agent additives such as silanes may be added. However, it is preferred that the curing agent is free of cycloaliphatic epoxy resins such as hydrogenated bisphenol A diglycidyl ether, hydrogenated bisphenol A diglycidyl ether oligomers, hydrogenated bisphenol F diglycidyl ether, hydrogenated bisphenol F diglycidyl ether and 3,4-oligomers-epoxycyclohexyl-methyl-3,4-epoxycyclohexyl carboxylate. The curing agent may be free or substantially free of water. It is often free of plasticizers.

In particular, with these new sealing compound-system, due to the particularly high fuel resistance, the sealing compound allows sealing of fuel tanks, such as in the wing of aircraft, during production, or sealing during normal operation and maintenance of aircrafts. In fact, a leak in the fuselage and in the fuel tanks is to be avoided. This allows a particularly fast and easy compounds repair. The sealing compound is preferably VOC-free.

For curing, the base mass and curing agent in this new sealing compound-system are mixed in a way that preferably a overstechiometric epoxy excess is present. The excess is in particular preferably 1 to 80 mol % or 5 to 50 mol % or 10 to 30 mol %. The base mass or/and the curing agent contain at least one photolatent base based on sterically blocked tertiary amines or/and in particular based on sterically blocked amidine. The photolatent bases may act as latent catalysts and may have different structures. They pertain to the class of α-aminoketones or/and amidines. It is preferred that the photolatent base during irradiation releases or/and forms at least one amine or/and aminidine and that the released or/and formed amine or/and aminidine catalyzes the reaction between mercapto-terminated polythioether and the epoxy-based curing agent. In particular it is preferred that the photolatent base activates or/and accelerates the reaction of the epoxy compound with mercaptan, when the admixed or/and the already curing sealing compound is irradiated.

Base composition and/or curing agent may additionally contain at least one additive selected from, for example, fillers, thixotropic agents, adhesion promoters, resins and solvents.

The advantages of this new epoxy curing polythioether based SCOD-sealing compound system are especially 1) that the sealing compounds have a high fuel resistance, 2) that they are highly elastic, 3) that due to the fast tack-free time and the rapid curing in the construction of airplanes, for example, shorter wait times and cycle times are possible and that therefore the productivity can be increased and 4) that curing in non-irradiated areas, in so-called "shade areas," of the sealing compound can take place and that a post-curing is carried out, so that, despite short exposure times and/or incomplete irradiation on the sealing compound application area, complete curing can be reached. With these sealing compound system tack-free times from 0.01 to 10 minutes and time until curing of 1 to 1,000 minutes can be achieved, in particular depending on layer thickness.

In contrast to known sealing compound systems in which curing is obtained with isocyanates or vinyl compounds, the new system described herein does not usually work with catalysts such as acetophenones, hexylphenylketon 1-hydroxycyclo-, 2-hydroxy-2-methyl-1 phenylpropane-1-one, 2,4,6-trimethylbenzoyl diphenylphosphine oxide, 2-dimethylamino-2-(4-methyl-benzyl)-1-(4-morpholin-4-yl-phenyl)-butan-1-one), 2-benzyl-2-dimethylamino-1-(4-morpholinophenyl)-butanone-1, bis(2,6-dichlorobenzoyl)-2,4,4-trimethylpentylphosphine. In these new formulations, it was found that photolatent 1, 5-diazabicyclo [4.3.0] non-5-ene (DBN) and/or photolatent 1, 8-diazabicyclo [5.4.0] undec-7-ene (DBU), may optionally be used successfully as a latent catalyst in the presence of at least one photosensitizer, such as benzophenone and/or thioxanthones. These photoinitiators or photolatent bases release much stronger bases than many other photoinitiators. Only these stronger bases can catalyze the reaction between the mercaptan and the epoxy group. If photoinitiators were used to release weaker bases, no sufficient curing could be achieved in the first attempt.

In the inventive method, it is preferred that the admixed, uncured or at least partially uncured SCOD sealing compound either A) is a mercapto-terminated base polymer based on a base mass, based on polythioether, polysulfide, their copolymers and/or mixtures thereof, at least one curing agent with a content of isocyanate having an average functionality in the range from 1.5 to 3.2 and at least one photolatent base on the basis of α-aminoketone, B) is based on a base mass with a mercapto-terminated polythioether, an epoxy-based curing agent and at least one photolatent base based on sterically hindered tertiary amine and/or based on sterically hindered amidine, wherein said photolatent bases act as latent catalysts, or C) is based on a thiol-terminated polythioether with a polyene with a polyvinyl ether and/or polyallyl compound and is based on a photoinitiator, preferably selected from the group consisting of acetophenones, α-aminoalkylphenones, benzoinethers, benzoyloximes, acylphosphine oxides, bisacylphosphine oxides, benzophenones, Michler's ketone, thioxanthones, anthraquinones, camphorchinones, fluoronones and ketocoumarins, wherein the mixed, uncured or at least partially uncured SCOD sealing compound may start to cure by supplying energy such as UV radiation.

In particular, in the inventive method, it is preferred that the at least one photoinitiator (for type C) or the at least one photolatent base (for type A and B), through high energy actinic radiation on a SCOD sealing compound, in particular of type A) or B) cleaves at least one molecule based o tertiary amine or/and amidine, which may initiate the curing of the SCOD sealing compound as an active catalyst, and that the at least partially uncured SCOD sealing compound after short irradiation with, in particular, high energy actinic radiation, does not require further irradiation, and continues curing in the temperature range between −10 and +70° C.

A photolatent base is one type of photoinitiator.

In the inventive method, it is preferred that the energy input in step iv) of the inventive method is performed by irradiation with IR-radiation, NIR-radiation, microwave radiation, VIS-radiation, UV-VIS-radiation, UV-radiation, ultrasound radiation, electron radiation, gamma radiation, beta radiation or/and alpha radiation, which are considered as types of high energy radiation according to the present application. Particularly preferred at step iv) is the use of UV light at wavelengths in the range of about 100 to 400 nm or UV-VIS light at wavelengths in the range of about 100 to 600 nm. Particularly preferred is the use of UV radiation, which—possibly as UV-VIS-radiation—has high proportions of UV-A radiation, in particular at wavelengths in the range of about 315 to 400 nm or/and UV-B radiation, in particular having wavelengths in the range of about 280 to 315 nm and only minor or even no UV-C radiation, in particular at wavelengths approximately in the range of 100 to 280 nm, in particular also as approximately monochromatic radiation, as produced, for example, by UV LEDs. Typically, the intensity of a radiation source of the radiation unit is predetermined, so that often only the irradiation time and the distance between the radiation unit and the sealing compound coating can be varied. The distance between the radiation source and the sealing compound coating will vary in many embodiments in the range of 1 to 100 mm. With a sealing compound which contains a photosensitizer for UV-A, UV-B and/or UV-C radiation, the energy input by this radiation registered can be used particularly effectively for the initiation or activation of the desired chemical reactions.

The following table 3 shows the radiation dose and curing times for different UV radiation types, depending on the distance and irradiation time. Following requirements were considered: UV intensity on the sealing compound surface: 0.2 to 5.0 W/cm$^2$, UV dose on the sealing compound surface: 2100 J/cm$^2$, distance between emitter and a SCOD sealing compound of type A: 10 to 100 mm, irradiation time: 3 to 90 s, Blue Wave 200 (Model 38605) Spotlight 200 W, 40* W/cm$^2$; Fe, Ga-doped Hg vapor lamps or pure mercury vapor lamps or a UV LED spotlight, spectral range: 200 to 450 nm, as measured by UV Power Puck II S/N 19860, *measured directly at the lamp. In particular, mixtures were applied on a specimen with a layer thickness of 6 mm, and then irradiated.

Thereby values of 0.2 W/cm$^2$ and 2 J/cm$^2$ could be selected as lower limits for intensity and corresponding dose. In fact, if values should fall below 0.2 W/cm$^2$, results would not improve, even if the UV dose is increased by a longer UV irradiation.

TABLE 3

UV radiation types and their effects on irradiation time, as a function of distance

| Irr. time (s) | Distance (cm) | UV-VIS | UV-AII | UV-A | UV-B | UV total | Tack-free time (min) | Time to Shore A 30 (min) |
|---|---|---|---|---|---|---|---|---|
| | | | | Dose (J/cm$^2$) | | | | |
| 3 | 3 | 2.17 | 0.94 | 1.39 | 0.27 | 3.83 | 0.5 | 30 |
| 15 | 3 | 10.95 | 5.02 | 6.53 | 1.20 | 18.68 | 0.2 | 10 |
| 6 | 6 | 1.48 | 0.50 | 0.96 | 0.16 | 2.60 | 1.0 | 60 |
| 9 | 9 | 1.08 | 0.39 | 0.72 | 0.12 | 1.91 | 1.5 | 90 |
| 18 | 9 | 2.13 | 0.76 | 1.40 | 0.20 | 3.73 | 1.2 | 80 |
| 30 | 15 | 1.18 | 0.37 | 0.75 | 0.00 | 1.93 | 2.0 | 120 |
| 60 | 20 | 1.17 | 0.00 | 0.77 | 0.00 | 1.94 | 4.0 | 160 |
| 90 | 30 | 0.00 | 0.00 | 0.00 | 0.00 | 0.00 | 180 | 600 |

In the inventive method it is preferred, that the not yet cured sealing compound coating at step (iv) due to irradiation, is/becomes already tack-free after a time of about 0.01 to 5 minutes after irradiation. The tack-free state may be obtained in this case even after 0.2 to 4.5 minutes, 0.5 to 4 minutes, 1 to 3.5 minutes, 1.5 to 3 minutes or 2 to 2.5 minutes. It is particularly preferred, that the still uncured sealing compound coating at step iv) due to irradiation already is/becomes tack-free 1 minute or 30 seconds after irradiation. The tack-free time is measured according to DIN 65262-1, August 1996, 3.1.2.5. The measurement of Shore A hardness is performed according to DIN EN ISO 8 68, October 2003, by mean of a type A Shore durometer. The value of Shore A hardness is read out within one second.

The rapid tack-free state is a particular advantage of the invention. In fact, the exceptional fast achievement of the tack-free state is the prerequisite for allowing the continuation of working on a component at a distance of one meter or several meters, for example, about a freshly coated application site within the shortest time possible, and for avoiding the inclusion of waste, abraded material, chips and dirt, such as dust, in particular from drilling, machining or/and grinding or/and due to air drafts in the surface of the sealing compound coating, until the tack-free state is reached. On the other hand, it is often also necessary to wait until the tack-free state is reached, before treading or moving on a component. In particular, this refers to the mechanical processing of materials or/and surfaces in proximity of still uncured sealing compound coatings, such as machining of components made of metallic or/and organic materials or/and composite materials, such as by drilling, machining or/and grinding or/and operations or/and manipulation at corresponding components, such as on shell or wing components, in which, in particular, waste, abraded material, chips, deformations and soiling may occur, and in which a physical contact with uncured sealing compound coatings may also take place. Only a tack-free state of the surface of the sealing compound coating does not present these problems, so that the mechanical processing, operations and handling in proximity of the sealing compound coating may be continued.

Usually, when the sealing compound coatings are "tack-free" no defect occurs. In fact, this surface curing is usually sufficient for avoiding that, in the tack-free state, no chip or pollutant may adhere to the sealing compound surface. Therefore, the subsequent operations such as grinding, drilling and machining on components already provided with sealing compounds may be continued within a much shorter time. For this reason, the particular fast achievement of the tack-free state of surfaces of sealing compound coatings is particularly important for an accelerated and defect-free production in the aerospace sector.

Individual components require a previous complete curing before being moved under mechanical load. A tack-free state is usually not sufficient, since the sealing compounds in some areas such as when applying floor plates or structural elements may deform, since due to their still plastic part, they still don't have the required recovery capacity. Starting with a Shore A hardness of 30, for example, an adequately high elastic proportion is usually presumed. But if a sealing compound coating is tack-free after a very short time, Shore A hardness of 30, for example, is also achieved within a short time, so that this component may be subject to mechanical loads, as shown in table 1 and 2.

The further curing of the sealing compound in the coatings starting from the tack-free state or starting from a specific predetermined Shore A hardness, may last, without problems, for several days. The curing duration is thus unimportant.

Differently than with above said components, the sealing compound coatings produced according to the invention are subject to a small or no mechanical load, since the connection elements are not coated by the sealing compound, before the provision of the force fit, so that the achievement of the tack-free state is usually sufficient for these sealing compound coatings.

In the inventive method it is preferred that, if necessary, such as in the case of change during application on or/and between differently shaped connection elements, gaps or/and uneven connection sites to be sealed, a change from at least one nozzle element or from at least a portion of a nozzle element such as a cap, nozzle, connection channel or/and connection element to a sealing compound reservoir, such as a sealing compound tank is performed. The nozzle element may be essentially composed of one to five parts, which, as required, may be differently formed. However, they usually may comprise the following integrated or multi-part elements:

Two basic configurations of the inventive nozzle elements are provided:
A) nozzle element (0), essentially composed of 1) a connection element (1) to a sealing compound reservoir such as a sealing compound tank, at the rear end, which is directly or indirectly connected to a sealing compound reservoir, and 2) a connection channel (2), which, if required, may transition so to a nozzle, cap or/and tool at the front end, and
B) nozzle element (0), essentially composed of 1) a connection element (1) to a sealing compound reservoir such as a sealing compound tank, at the rear end, which is directly or indirectly connected to a sealing compound reservoir, and 2) a connection channel (2) and 3) a nozzle, cap or/and tool (3) at the front end.

In preferred embodiments, the direct or indirect connection with an integral nozzle element (0) or one of its parts such as a connection element (1) to a sealing compound reservoir by a connecting technique such as a bayonet lock, a snap lock or a fast clamping apparatus or by insertion on a housing are allowed. In many variant, the connection channel (2) is oblong and allows that the sealing compound is transported in the direction of the surface to be coated, and that a distance for manipulation of the mechanical or automated part (4) is provided. In addition, the connection channel (2) preferably has an essentially tubular, hose-like or/and conical shape and is rigid, bendable or flexible, wherein a flexible connection channel (2) may be bent or/and movably guided, as required.

In preferred embodiments, an integral nozzle element (0) on the connection element (1) for a sealing compound reservoir is provided with a connection channel (2), which, in particular, has a tubular, hose-like or/and conical shape and is rigid, bendable or flexible, wherein a flexible connection channel (2) may be bent or/and movably guided, as required, and its front end a) is essentially shaped like the rest of the connection channel (2), b) has a nozzle extension, such as a conical tapering or c) ends with a nozzle, a cap or/and a tool at the front end.

In preferred variants, a multi-part nozzle element (0) on the connection element (1) for a sealing compound reservoir such as in a sealing compound tank, is provided with a connection channel (2), which essentially has a tubular, hose-like or/and conical shape and is rigid or flexible, wherein a flexible connection channel (2) may be bent or/and movably guided, as required, and its front end a) is essentially shaped like the rest of the connection channel (2), b) has a nozzle extension, such as a conical tapering or c) ends with a nozzle, a cap or/and a tool at the front end, wherein either the connection element (1) for a sealing compound reservoir and the connection channel (2), either the connection channel (2) and the nozzle, the cap or/and the tool (3) or the connection element (1) for a sealing compound reservoir, the connection channel (2) and the nozzle, the cap and/or the tool (3) are provided as separate parts and are adapted for their mutual connection and/or separation by engaging with a housing, by rotation, for example, on a thread or bayonet, stapling, gluing, snapping or/and a quick connect apparatus.

A nozzle extension may, preferably, a) have an essentially round shape of constant diameter or a conical shape, b) an essentially oval shape of essentially constant diameter or an essentially conical shape, c) an essentially polygonal shape, such as essentially triangular, square, pentagonal, or hexagonal or d) have a shape which is laterally widened with respect to the transportation direction of the sealing compound, in order to allow an essentially wide and thinner application of sealing compound. Such a nozzle extension may, if required, be used also for specific shaping or/and surface smoothing, in particular with a spatial, lateral or/and rotational movement.

A nozzle may be more specific or/and larger than a nozzle extension, if required. The nozzle may in particular have the shape of a typical nozzle, possibly with protruding or/and bent surfaces or/and parts. Many, but possibly not all nozzle shapes are generally known.

In particular embodiments, the nozzle may have a particularly wide front end, and it may have, if necessary, in the cross section of the surface, a flat or elongated as well as narrow or wide bell shape, so that, during or/and after application of the sealing compound, a movement of the nozzle by rotation about an axis, for example, is essentially perpendicular to the surface or/and may be performed by an essentially surface parallel movement, in order to provide an applied sealing compound, for example, with an essentially rotation-symmetric or oval distorted bell shape, with a flat rotation-symmetric oval distorted or/and oblong mound or a so-called bead and possibly also a smoothing of the surface of the sealing compound. In an automated method, due to optimization of steps, due to optimized form of the shape and surface of the sealing compound coating and due to uniform and similar operation, a subsequent smoothing of the surface of the sealing compound coatings may be omitted.

Due to the flat or elongated and narrow or wide bell shape, the shape and dimensions of the applied sealing compound may be adapted to the shape and dimensions of a connection element protruding from a surface with a sufficient sealing compound coating or/and on the application of sealing compound in and over a gap or/and an uneven connection site, with a sufficient sealing compound coating.

A cap may be provided with a plurality of shapes and dimensions. It can in particular be used for sealing of at least one connection element protruding from the surface. It can, in particular, have essentially the form of bells, mound-like or/and elongated cones and caps, which are preferably adapted, regarding dimensions and relationships with the inner diameter to the height, to the outer diameters and heights of connection elements protruding from a surface, such as bolts, rivets, nuts or/and screws, and whose distance from the cap is at least 0.5 mm, at least 1 mm or at least 2 mm, or/and whose "wall thickness" for the sealing compound between different measurement points of the connection element from the cap inner surface, are in the range from about 0.5 to 15 mm, 1 to 12 mm, 2 to 10 mm, 3 to 8 mm or 4 to 6 mm. The sealing compound coatings over protruding connection elements and in particular the cones often have dimensions in the range of about 5 to 100 mm regarding the outer diameter and a height, measured perpendicularly to the base surface in the range of about 5 to 50 mm.

A tool may also be provided in a plurality of shapes and sizes. It may be used alone on a connection element (1) and be in one piece or multiple parts on a holder (2a). Alternatively, a nozzle or cap may be used as a tool, wherein the nozzle or cap, due to the spatial, lateral or/and rotational movements and due to its shape on the foremost base, can be used as a tool.

In the inventive method, it is preferred that the average treatment time for each connection element, gap or uneven connection site on an application site on the surface lies in the range from 0.1 to 60 seconds, 5 to 40 seconds, 8 to 20 seconds or 10 to 15 seconds, in order to apply a SCOD sealing compound on the surface and possibly also to provide it with the desired shape, before the nozzle element is moved to the successive application site.

In the inventive method it is preferred that the average standby time for all connection elements, gaps or uneven connection points in at least one application site on the surface, to be treated simultaneously or essentially simultaneously, lies in the range of 3 to 120, 5 to 80, 8 to 40 or 10 to 30 seconds, wherein these waiting time to tack-free state of the sealing compound in at least one application site A) starts with the removal of at least one unit or/and one tool for setting or/and attaching at least one connection element, such as during riveting or/and screwing or/and B) starts with the movement of at least one nozzle element on the at least one application site to be subsequently treated and preferably C) ends when reaching the tack-free state of the one or more surfaces of the at least one sealing compound coating or/and D) ends after a movement of at least one unit of the inventive apparatus or/and of at least one unit for drilling or/and other mechanical processing, for cleaning, of at least one connection element, for example, during riveting or/and screwing. This waiting time can therefore be calculated as the time from A) to C), from A) to D), from B) to C) or from B) to D).

In the inventive method, it is preferred that the nozzle element (0) is essentially composed of a connection element (1) to a sealing compound reservoir, a connection channel (2) and possibly a nozzle, a cap or/and a tool (3) or/and a nozzle extension on the connection channel (2), wherein the nozzle element (0) may be in one or multiple parts. The connection channel (2) preferably tapers from the connection element (1) to a sealing compound reservoir to the front end of the connection channel (2) or to its nozzle extension or to the element (3) of nozzle, cap or/and tool.

In the inventive method, it is preferred that the connection channel (2) essentially has a tubular shape and is possibly bendable or/and flexible.

In the inventive method, it is preferred that the at least one photoinitiator of an inventive sealing compound, when subject to energy input and in particular to high energy actinic radiation, cleaves at least one molecule based on tertiary amine or/and amidine, which may initiate, as an active catalyst, the curing of the inventive SCOD sealing compound. Catalysts are, for example, the photolatent amidine bases, which may carry different protection groups, such as 4-(hexahydro-pyrrolo[1, 2-a] pyrimidin-1-ylmethyl)-benzoic acid methyl ester, 4-(hexahydro-pyrrolo[1, 2-a]-pyrimidin-1-ylmethyl)-benzoic acid butyl ester, [4-(hexahydro-pyrrolo[1, 2-a] pyrimidin-1-ylmethylrphenyl]-methanol, hexanoic acid-4-(hexahydro pyrrolo[1, 2-a] pyrimidin-1-yl methyl)-benzyl ester, 4-(octahydro-pyrimido [1, 2-a] azepin-1-ylmethyl)-benzoic acid methyl ester and/or 4-(octahydro-pyrimido[1, 2-a] azepin-1-y) methyl)-benzoic acid hexyl ester. After brief exposure to the high energy actinic radiation, the uncured inventive SCOD sealing compound requires no further irradiation and continues curing in the temperature range from −10° C. to +70° C.

In the inventive method, it is preferred that the admixed inventive SCOD sealing compound cures at step iv), forming a tack-free sealing compound.

In the inventive method, it is preferable that the connecting element protruding from the surface is essentially a bolt, a rivet, a screw, a threaded rod, a nut, a pin or a similarly shaped protruding connection element, that the gap is essentially a leak, a hole, a seam, a groove or a contact site between a plurality of structural elements on the surface and/or that the uneven connection site is essentially a folded seam, an adhesive site, a welding point, a welding seam or/and an unevenness.

In the inventive method, it is preferred that the surface from which the at least one connection element protrudes or/and which has a gap and/or an unevenness, is an external or internal surface of a construction element and/or of a component of an aircraft or spacecraft component.

In the method according to the invention, it is preferable that the surface essentially consists of at least one metallic material such as an aluminum, iron, magnesium and/or zinc alloy, of at least one composite material such as carbon fiber-reinforced carbon CFC, of carbon fiber-reinforced plastic CFRP and/or at least one organic material and/or a material such as a plastic, adhesive and/or paint. Here, the plastic can for example be one based on polyetherimide PEI, polycarbonate PC or polymethylmethacrylate PMMA. The paint can, for example, be based on (meth)acrylate, epoxy and/or polyurethane. The materials used are known in principle.

In the inventive method it is preferred that at least one of steps i) to v) or/and at least one step of claim 3, in which the still uncured sealing compound coating is formed or/and superficially smoothed before step iv) with a tool or/and is formed or/and superficially smoothed at step ii) or/and iii) by spatial and in particular linear or/and rotating movement of the nozzle element by removing the sealing compound line or/and by movement of the tool, in order to achieve the final form, are performed with at least one automatable or automatic apparatus, which operates essentially or prevalently in the same way.

In the inventive method, it is preferred that at least one of the steps i) to v) or/and at least one step of claim 3, is performed with at least one automatable or automatic apparatus, which operates essentially or prevalently in the same way. It is herein preferred that the at least one of steps i) to v) or/and the step of claim 3 are performed with one, two, three, four or more than four differently operating automatable or automatic apparatuses. It is preferred that these processes in two or more than two differently working automatable or automatic apparatuses are performed approximately at the same time at different application sites or that these processes are performed by two or more than two automatable or automatic apparatuses, prevalently operating in the same way, in succession at the same application site.

It is particularly preferred that the largest possible number of steps are performed in at least one step and that a plurality of the steps is performed by a single automatable or automatic apparatus. In fact, this can allow simplifications and time savings for example in the case of the travels.

In the inventive method, it is preferred that at least two application sites are treated essentially simultaneously or essentially simultaneously in series. It is herein preferred that at least 3, at least 4, at least 5, at least 6, at least 7, at least 8, at least 9, at least 10, at least 11, or at least 12 and particularly preferably at least 14 application sites are processed essentially simultaneously in at least one process step, in at least 2, at least 3, at least 4 or 5 of steps or are essentially processed simultaneously in a series.

A larger number of application sites and a larger number of automatable or automatic apparatuses, which essentially or prevalently operate in different ways is particularly preferred in particular for larger components with a larger number of application sites, such as in the case of processing of airfoils. In this case, these automatable or automatic apparatuses may be connected, if necessary, at least partially, in an automated process or/and in mechanical-spatially associated connections.

The term "essentially simultaneously" according to the present application indicates that, in regular operations, a time difference, as a time delay, of up to 30 seconds, 20 seconds or 10 seconds may occur between two different steps.

In the inventive method, it is preferred that at least one automatable or automatic apparatus is moved or automatically moved for executing the method or at least one of its units after performing the processes of at least one step of claim 1 at the processed application site, in such a way that it reaches a following application site with a connection element protruding from the surface, a gap or an uneven connection site (application site) and performs the processes in that position.

In the inventive method, it is preferred that at least one unit of the automatable or automatic apparatus performs steps i) to iii) for executing the method according to the invention, while at least one other unit performs step iv).

In the inventive method, it is preferred that at least one unit of the automatable or automatic apparatus performs steps i) to iii) for executing the method of the invention, while essentially simultaneously, at least one other unit performs step iv).

In the inventive method, it is preferred that at least one unit of the automatable or automatic apparatus, for executing the method according to the invention for steps i) to iii) and that at least another unit for step iv), after executing the processes, are essentially simultaneously displaced to the following application site.

In the inventive method, it is preferred that all steps i) to v) are performed before either the at least one unit of the automatable or automatic apparatus for executing the method of the invention for steps i) to iii) and the at least other unit for step iv) or the entire automatable or automatic apparatus is/are displaced to the following application site after execution of processes, essentially simultaneously.

In the inventive method it is preferred that the displacement of the units or of the entire apparatus is performed in a way that at at least one application site with a connection element protruding from a surface or at at least one uneven connection site, which are disposed in a plane or surface perpendicular to the surface, and are essentially arranged in a one-dimensional arrangement, the various processes for an application site are performed in succession, wherein respective 1 to 15 units of the same type essentially simultaneously perform their processes at corresponding 1 to 15 application sites, before the displacement to corresponding 1 to 15 application sites takes place.

In the inventive method it is preferred that the displacement of units or of the entire apparatus is performed in a way that at at least one application site with a connection element protruding from a surface or at at least one uneven connection site, which are disposed in a plane or surface perpendicular to the surface, and are essentially arranged in a one-dimensional arrangement, the various processes for an application site are performed in succession, wherein different units are alternatively disposed in the plane or surface, wherein respective 1 to 45 different units respectively perform essentially simultaneously their processes on corresponding 3 to 45 application sites, before the displacement to at least 2 application sites takes place.

In the inventive method it is preferred that a plurality of units of the same type, in particular for steps i) to iii), are essentially positioned along a preferably straight line, and that a plurality of units of the same type, in particular for step iv), are essentially positioned along a second preferably straight line, wherein the units of the first and second line may essentially be positioned at equal distances or in an angled arrangement, so that a plurality of application sites with connection elements protruding from the surface or with uneven connection sites, which are positioned on the surface, such as a wing or fuselage of an aircraft, may be essentially simultaneously machined or are machined, wherein respective 2 to 15 units of the same type in both lines perform, essentially simultaneously their processes at corresponding 2 to 15 application sites, before the displacement by corresponding 2 to 15 application sites on both lines to further lines takes place in the direction of the lines or essentially perpendicularly thereto.

The object is also achieved by an automatable or automatic (=at least partially automated) apparatus for performing the method of the invention, which is characterized in that it has at least one station for at least one of steps i) to v) and at least one nozzle element and—possibly separately—at least one irradiation unit.

In this case, the at least one nozzle element and the at least one irradiation unit may be mechanically connected or be separate from each other. They may be operated, in both cases, by a common or separate control unit.

It is preferred that at least 2, at least 3, at least 4, at least 5, at least 6, at least 7, at least 8, at least 9, at least 10, at least 11, or at least 12 and particularly preferably at least 14 stations are provided for at least one, for at least two, at least three, at least four, or for each of the method steps i) to v).

In the inventive apparatus, it is preferred that it comprises an apparatus for forming sealing compound coatings for sealing of bolts, rivets, screws, welding spots or similar connection elements or similar application sites, in a linear and possibly also bendable or tiltable apparatus, in which a plurality of stations are series connected.

In the inventive apparatus, it is preferred that it is provided with at least one unit for steps i) to iii), at least one unit for step iv) or at least one unit for steps i) to iv).

In a particularly preferred embodiment, the apparatus may a) comprise a sealing compound reservoir, for example, in at least one mixing apparatus with a sealing compound tank, in at least one sealing compound tank, in at least one cartridge or/and in at least one cartridge magazine with at least one filled cartridge, b) at least one nozzle element and/or c) at least one irradiation unit. Alternatively, instead of a sealing compound tank or a mixing apparatus with a sealing compound tank, also at least one cartridge or/and a cartridge magazine may be used.

In the inventive apparatus, it is preferred that the unit for steps i) to iii) or iv) has elements for nozzle, cap or/and tool replacement (element replacement), in which during a nozzle, cap or/and tool replacement, a change of the nozzle shapes, dimensions, cap shapes and dimensions or/and tools may be performed,
a) by rotating a turret with a plurality of such elements of different shapes and sizes,
b) by moving a magazine with a plurality of such elements of different shape so and size,
c) by removing, unscrewing, rotating a bayonet-lock, unsnapping of a previously used such element or release of a fast clamp apparatus or/and by connecting with or by engaging, screwing, rotating of a bayonet lock, snapping in of such an element or connecting such an element of given shape or/and size over a fast clamp apparatus, or/and
d) by using at least one oblong nozzle element which is divided, in particular in a median part, lengthwise, whose parts may be connected or separated by insertion, rotation, bayonet lock, snapping or fast clamps, in which the nozzle part for a sealing compound container such as a tank is not replaced at each nozzle replacement, and in which the nozzle part with a nozzle extension or with a cap for forming the sealing compound coating or the sealing compound cap is replaced.

A nozzle element or a part thereof may possibly be taken from a magazine or holder or possibly a nozzle element or a part thereof may be repositioned in the magazine or holder. Alternatively, the previously used nozzle element or a parte thereof may be scrapped and, if necessary, replaced with a new one.

In the inventive apparatus, it is preferred that the unit for or with step iv) has at least one irradiation unit for energy input at step iv) by IR radiation, NIR radiation, microwave radiation, VIS radiation, UV-VIS radiation, UV radiation, ultrasound radiation, electron radiation, gamma radiation, beta radiation and/or alpha radiation and especially UV or UV-VIS radiation. UV or UV-VIS radiation are particularly preferred, since they are particularly suitable for initiation or activation of the respective reactions and processes, but also are devoid of dangerous wavelengths. Moreover, this radiation is easily generated by UV-LEDs.

In the inventive apparatus it is preferred that it comprises at least one element or/and at least one unit for at least one step of claim 3—in which the still uncured sealing compound coating is formed or/and superficially smoothed before step iv) with a tool or/and is formed or/and superficially smoothed at step ii) or/and iii) by spatial and in particular linear or/and rotating movement of the nozzle element by removing the sealing compound line or/and by movement of the tool, in order to achieve the final form.

In the inventive apparatus, it is preferred that it contains an apparatus for cleaning the nozzle element or one of its parts, such as by compressed air in a way that the removed sealing compound residues and dirt are not blown or directed towards the sealing compound coatings.

If necessary, the inventive apparatus may be provided with and controlled by at least one control unit or at least one programmable unit. Herewith, in particular all possible times for different activities and units, pressure for partitioning of the sealing compound quantity for a coating, the dosing speed, the different positions, the movements, the movement speeds, and the travel lengths may be controlled.

The object is also achieved by an aerospace vehicle, which is characterized in that it has at least one connection element, which has been processed with the inventive method.

The object is also achieved by use of the inventive method or/and of the inventive apparatus at or/and in an aerospace vehicle.

It was surprising that with the inventive method a considerable improvement of geometry, surface smoothness and uniformity of geometry, size and shape could be achieved. Considerable advantages have been obtained in an automated or automatic method, in which a successive processing of the sealing compound coating regarding shape and surface quality could be completely omitted by adequately optimizing the method, wherein all sealing compound coatings of the same type had all the same appearance.

It was surprising, that with the inventive method a time saving in the order of 10 to 50% could be achieved, depending on the component, the requirements and the respective methodological conditions and their automation for a large number of application sites, with respect to conventional methods with considerable manual effort, wherein it was particularly evident that waiting times could be considerably shortened by using "on-demand curing" sealing compounds, in the condition of short tack-free times.

It was also surprising, that, due to the automated or automatic method, not only reduced material savings and high cost savings were possible, but also the quality of the sealing compound coatings, due to precise positioning and possibly also centering in case of protruding connection elements, not only provided a considerable quality improvement, avoiding too thin and then possibly insufficiently sealed parts of walls, but also a clear increase of sealing safety, for instance in the case of fuel tanks, even solving a safety problem.

The invention claimed is:

1. A method for sealing, coating and aerodynamic smoothing of at least one application site with a sulfur-containing sealant cure on demand (SCOD) sealing compound, using at least one automatable or automatic apparatus comprising at least one unit, wherein the at least one automatable or automatic apparatus comprises at least one nozzle element and at least one irradiation unit, and wherein the method is characterized in that
    i) the at least one nozzle element comprises an inner space that is indirectly or directly connected to a sealing compound reservoir, and contains a mixed, uncured or at least partially uncured SCOD sealing compound, which is guided or/and slipped over the at least one application site, and is brought into contact with a surface or near a surface of the at least one application site,
    ii) the inner space of the at least one nozzle element is filled with the SCOD sealing compound from a sealing compound reservoir, and is brought at least approximately in contact with the surface of the at least one application site to an extent that the at least one application site is completely covered by the SCOD sealing compound, wherein the SCOD sealing compound forms a sealing compound coating, which essentially has the shape of a sealing compound cap, or/and of a mound-shaped or bead-shaped elevation,
    iii) the at least one nozzle element or at least a part of the at least one nozzle element, is raised and moved, in a rotating movement, to smooth the sealing compound coating, and
    iv) the SCOD sealing compound is subjected to a curing step that is 1) initiated by at least one irradiation unit through energy input into a sealing compound coating, and either 2a) initiated by release of a latent catalyst or 2b) obtained by direct activation of at least one reaction component, so that the mixed SCOD sealing compound subsequently cures; and
    v) the at least one nozzle element is replaced by using at least one oblong nozzle element which is divided in median part, lengthwise, wherein one or more nozzle parts of the at least one oblong nozzle element may be connected or separated by insertion, rotation, bayonet lock, snapping or fast clamps, in which a nozzle part is not replaced at each nozzle replacement step, and in which a nozzle part selected from the group consisting of a nozzle extension or a nozzle cap, for forming the sealing compound coating or the sealing compound cap, is replaced; wherein the at least one nozzle element is taken from a magazine or holder or the at least one nozzle element is repositioned in the magazine or holder; and wherein the apparatus further comprises an apparatus for cleaning the nozzle element or a part thereof in a way that removed residues of sealing compound and residues of dirt are prevented from being blown or directed to the sealing compound coatings.

2. The method of claim 1, characterized in that the SCOD sealing compound at step ii) is led or/and ejected from a sealing compound reservoir on the at least one application site in a continuous line or in portions of a line.

3. The method of claim 1, characterized in that the uncured sealing compound coating, before step iv) is further smoothed using a tool.

4. The method of claim 1, characterized in that the sealing compound coating is essentially brought into a final form, which approximates the shape of a coating, bell, cap or/and a mound-shaped or bead-shaped elevation on the surface of the at least one application site.

5. The method of claim 1, characterized in that the sealing compound coating is applied over a clean surface of the at least one application site, which comprises an adhesion agent in the area of a contact surface of the sealing compound coating.

6. The method of claim 1, characterized in that the energy input at step iv) of the method is performed by irradiation selected from the group consisting of IR-radiation, NIR-radiation, microwave radiation, VIS-radiation, UV-VIS-radiation, UV-radiation, ultrasound radiation, electron radiation, gamma radiation, beta radiation, alpha radiation and combinations thereof.

7. The method of claim 1, characterized in that the sealing compound coating at step iv), is tack-free after a time of about 0.01 to 10 minutes after irradiation.

8. The method of claim 1, characterized in that the average treatment time for each application site lies in the range from 0.1 to 60 seconds, in order to apply a SCOD sealing compound on the surface and optionally to provide it with the desired shape, before the nozzle element is moved to a successive application site.

9. The method of claim 1, characterized in that the at least one nozzle element comprises (1) a connection element to the sealing compound reservoir, (2) a connection channel, optionally comprising a nozzle extension, and optionally (3) a nozzle, a cap or/and a tool wherein the at least one nozzle element may be in one or multiple parts.

10. The method of claim 9, characterized in that the connection channel essentially has a hose-like shape and is optionally bendable and/or flexible.

11. The method of claim 1, characterized in that the mixed SCOD sealing compound cures, at step iv), forming a tack-free sealing compound.

12. The method of claim 1, characterized in that the at least one application site is a connecting element protruding from a surface, and wherein the connecting element protruding from the surface is selected from the group consisting of a bolt, a rivet, a screw, a threaded rod, a nut, a pin or a similarly shaped protruding connection element, or combinations thereof.

13. The method of claim 12, characterized in that the surface, from which the at least one connection element protrudes, is an outer or inner surface of a construction element or/and of a component of an aerospace vehicle.

14. The method of claim 12, characterized in that the surface comprises at least one metallic material selected from the group consisting of aluminum, iron, magnesium, zinc alloy, and combinations thereof, at least one composite material selected from the group consisting of carbon fiber-reinforced carbon CFC, carbon fiber-reinforced plastic CFRP, at least one organic material, a plastic, an adhesive, a paint and any combination thereof.

15. The method of claim 1, characterized in that at least two application sites are processed essentially simultaneously.

16. The method of claim 1, characterized in that one automatable or automatic apparatus is configured to automatically move from a first processed application site to a successive application site.

17. The method of claim 1, characterized in that at least one unit of the automatable or automatic apparatus, performs steps i) to iii), while at least one other unit performs step iv).

18. The method of claim 17, characterized in that the at least one unit of the automatable or automatic apparatus performing steps i) to iii), operates essentially simultaneously with the at least one other unit performing step iv).

19. The method of claim 17, characterized in that at least one unit of the automatable or automatic apparatus, after performing a process at a first application site, is moved to a successive application site.

20. The method of claim 1, characterized in that all steps i) to iv) are performed before either the at least one unit of the automatable or automatic apparatus, or the entire automatable or automatic apparatus, after performing a process, is moved, simultaneously, to a successive application site.

21. The method of claim 1, characterized in that the at least one application site is a surface comprising a gap, wherein the gap is selected from the group consisting of a leak, a hole, a seam, a groove or a contact site between a plurality of structural elements on the surface, or combinations thereof.

22. The method of claim 1, characterized in that the at least one application site is an uneven connection site, wherein the uneven connection site is selected from the group consisting of a folded seam, an adhesive site, a welding point, a welding seam, or combinations thereof.

23. The method of claim 1, characterized in that the sealing compound reservoir is selected from the group consisting of at least one mixing apparatus, at least one sealing compound tank, at least one cartridge, at least one cartridge magazine, or combinations thereof.

24. The method of claim 1, characterized in that the mixed, uncured or at least partially uncured SCOD sealing compound comprises either
A) a mercapto-terminated base polymer based on a base mass based on polythioether, polysulfide, their copolymers and/or mixtures thereof, at least one curing agent with a content of isocyanate having an average functionality in the range from 1.5 to 3.2, and at least one photolatent base on the basis of a-aminoketone,
B) a mercapto-terminated polythioether based on a base mass, an epoxy-based curing agent, and at least one photolatent base based on sterically hindered tertiary amine and/or based on sterically hindered amidine, wherein said at least one photolatent base acts as a latent catalyst, or
C) a thiol-terminated polythioether with a polyene comprising a polyvinyl ether and/or polyallyl compound, wherein the thiol-terminated polythioether is cross-linked using at least one photoinitiator selected from the group consisting of acetophenones, α-aminoalkylphenones, benzoinethers, benzoyloximes, acylphosphine oxides, bisacylphosphine oxides, benzophenones, Michler's ketone, thioxanthones, anthraquinones, camphorchinones, fluorenones and ketocoumarins,
wherein the mixed, uncured or at least partially uncured SCOD sealing compound is cured by supplying energy comprising UV radiation.

25. The method of claim 24, characterized in that the at least one photoinitiator, or the at least one photolatent base, through high energy actinic radiation on a SCOD sealing compound, cleaves at least one molecule based on tertiary amine or/and amidine, initiating the curing of the SCOD sealing compound as an active catalyst, and that the at least partially uncured SCOD sealing compound after short irradiation with, high energy actinic radiation, does not require further irradiation, and continues curing in the temperature range between −10 and +70° C.

* * * * *